Apr. 24, 1923.  1,453,056
G. P. RISSER ET AL
TRACTOR
Filed Feb. 10, 1921  2 Sheets-Sheet 2
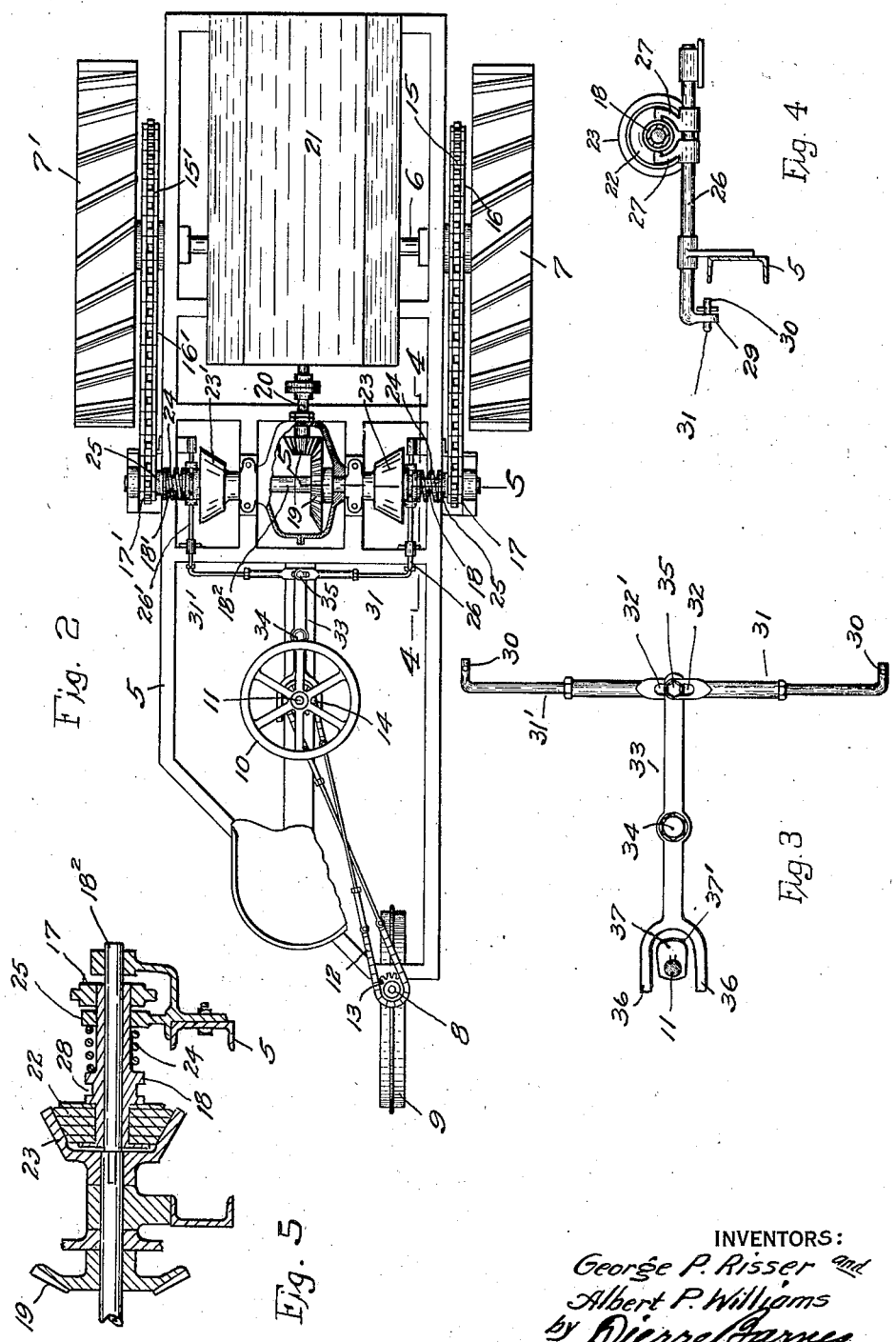
INVENTORS:
George P. Risser and
Albert P. Williams
by Pierre James
ATTORNEY Patented Apr. 24, 1923.

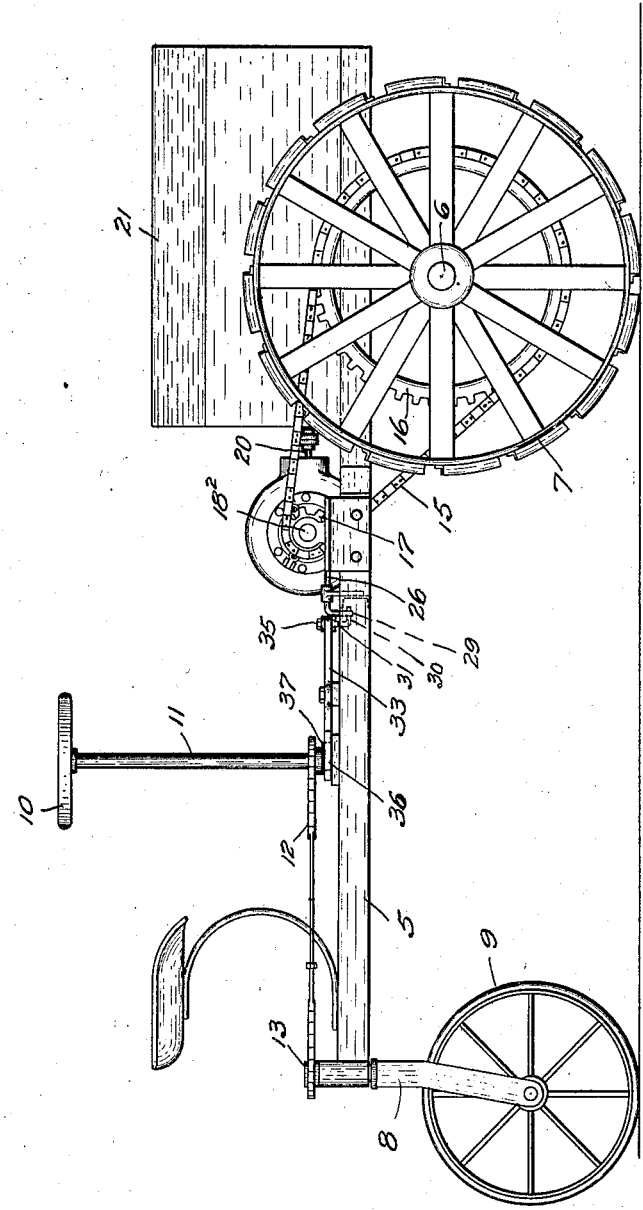

1,453,056

UNITED STATES PATENT OFFICE.

GEORGE P. RISSER AND ALBERT P. WILLIAMS, OF SEATTLE, WASHINGTON.

TRACTOR.

Application filed February 10, 1921. Serial No. 443,817.

*To all whom it may concern:*

Be it known that we, GEORGE P. RISSER and ALBERT P. WILLIAMS, citizens of the United States, residing at Seattle, in the county of King and State of Washington, have invented certain new and useful Improvements in Tractors, of which the following is a specification.

This invention relates to tractors of the tricycle type, and is designed more especially for agricultural purposes.

The object of our invention is the improvement of the driving and steering mechanisms of vehicles of this character to render the same more efficient in operation and more readily steered.

The invention consists in the novel construction, adaptation and combination of parts as will be hereinafter described and claimed.

In the accompanying drawings, Figure 1 is a side elevation of a farm tractor embodying our invention; and Fig. 2 is a plan view thereof. Fig. 3 is a plan view to an enlarged scale of a portion of the controlling devices for the traction wheel driving mechanism. Fig. 4 is a detail sectional view through 4—4 of Fig. 2. Fig. 5 is a sectional view taken substantially through 5—5 of Fig. 22, with the counter shaft shown in elevation.

In said drawings, the reference numeral 5 represents the tractor frame supported at its front end upon the axle 6 of traction-wheels 7, $7^1$, and at the rear upon a rotary forked post 8 which carries a guide wheel 9.

Said guide wheel is controlled through the instrumentality of a steering wheel 10 and steering post 11 by means of a chain 12 passing about sprocket wheels 13 and 14 on the respective posts.

As shown in Fig. 2, endless chains 15, $15^1$ passing about sprocket wheels 16, $16^1$ secured to the hubs of the respective traction wheels serve to drive the latter from sprocket wheels 17, $17^1$ provided upon sleeves 18, $18^1$ which are mounted upon a transversely arranged counter shaft $18^2$.

This counter shaft is continuously rotated while the tractor is operating as by means of bevel gears 19 from the propeller shaft 20 of an engine provided within a housing 21 located over the axle 6.

The sleeves 18, $18^1$ carry members, such as 22, Fig. 5, of any well known or suitable clutches, friction-cone clutches being herein illustrated, said members being engageable with complementary members 23, $23^1$ secured to said counter shaft whereby the respective sleeves and the driving mechanisms for the traction wheels may be operatively connected with or disconnected from the power driven counter shaft $18^2$.

The shiftable members 22, of said clutches are yieldingly held in couple with their complementary members by springs 24 bearing against journal boxes 25.

For disengaging said clutches, we provide longitudinally disposed rocker shafts 26, $26^1$ having forked arms as 27 (Fig. 4) engageable in peripheral grooves, as 28 (Fig. 5), provided in the respective sleeves. Said rocker shafts are also provided at their rear ends with arms 29 in apertures of which are engaged the fingers 30 provided on the outer ends of links 31, $31^1$ whose other ends are provided with slots 32, $32^1$. 33 represents a lever arranged longitudinally of the tractor and fulcrumed to the frame 5 as by means of a bolt 34. The forward arm of the lever is provided with a vertically disposed stud or bolt 35 extending into both of the aforesaid link-slots 32, $32^1$.

The rearwardly extending arm of said lever is slotted or bifurcated, see Fig. 3, to receive between the bifurcations 36 thereof a cam 37 which is mounted upon the steering post 11.

Said cam is of an oblong-ovate shape mounted eccentrically upon the post, the width of the cam being less than the distance between the bifurcations 36 and the curvature of the cam end $37^1$ most remote from the post axis being concentric to the latter.

The operator by suitably rotating steering wheel 10 and the post 11 primarily affects the guide wheel 9 to impart initial turning movements to the vehicle.

In rotating said steering post the cam 37 is rotated therewith to impart movement to the lever 33.

By reason of the cam being of less width, however, than the lever slot, there is a certain amount of lost motion afforded to the steering post before the cam becomes operative with respect to the lever 33 thereby rendering the guide wheel operative preliminary to the lever being actuated to effect the disengagement of a clutch.

Neither of the clutches are therefore disengaged until the initial turning of the tractor has been effected by said guide wheel.

When either of the clutches are disengaged the associated traction wheel becomes idle, whereupon the power is applied through the medium of the engaged clutch and the transmission mechanism connected therewith to drive the other traction wheel, resulting in the latter cooperating with the guide wheel 9 for turning the tractor.

From the foregoing, it is apparent that the steering of the vehicle is accomplished by a unitary operating device which controls both the manually regulated guide wheel 9 and the power driven traction wheels 7 and $7^1$, so that the latter may be utilized selectively to drive the vehicle or to cooperate with the guide wheel to turn the vehicle.

What we claim, is,—

In a tractor, a guide wheel oscillatable about a vertical axis, a steering post operatively connected to said guide wheel for regulating the latter, an axle, two traction wheels rotatably mounted thereon, power operated means including two clutches for driving the respective traction wheels, means for releasably retaining said clutches in their engaged relations, two rock shafts operatively connected with the detachable members of the respective clutches, links connected from one arm of each to the respective rock shafts, a lever connected to the other ends of said links, and a cam operated by said steering post for oscillating the lever to uncouple said clutches selectively.

Signed at Seattle, Washington, this 2nd day of February, 1921.

GEORGE P. RISSER.
ALBERT P. WILLIAMS.

Witnesses:
PIERRE BARNES,
MARGARET G. SUPPLE.